United States Patent [19]

Hanna et al.

[11] Patent Number: 5,384,393
[45] Date of Patent: Jan. 24, 1995

[54] COPOLYMER OF CARBON MONOXIDE AND PROPYLENE AND PROCESS FOR ITS FORMATION

[75] Inventors: Paul K. Hanna, East Windsor, N.J.; Andrzej M. Piotowski, Peekskill, N.Y.; David L. Kershner, Tenafly, N.J.

[73] Assignee: Akzo Nobel N.V., Arnhem, Netherlands

[21] Appl. No.: 235,207

[22] Filed: Apr. 29, 1994

Related U.S. Application Data

[60] Continuation of Ser. No. 96,576, Jul. 23, 1993, abandoned, which is a continuation of Ser. No. 911,822, Jul. 10, 1992, abandoned, which is a division of Ser. No. 595,069, Oct. 10, 1990, abandoned.

[51] Int. Cl.⁶ .............................................. C08G 67/02
[52] U.S. Cl. ..................................... 528/392; 528/271
[58] Field of Search ................................ 528/392, 271

[56] References Cited

U.S. PATENT DOCUMENTS

| | | |
|---|---|---|
| 2,541,987 | 2/1951 | Cramer et al. |
| 3,694,412 | 9/1972 | Nozaki et al. ............... 260/63 CQ |
| 3,694,419 | 9/1972 | Nozaki .......................... 528/392 |
| 4,824,934 | 4/1989 | Van Broekholen et al. ...... 528/392 |
| 4,880,903 | 11/1989 | Van Broekhoven et al. ..... 528/392 |
| 4,921,938 | 5/1990 | Drent ............................. 528/392 |
| 4,970,294 | 11/1990 | Drent et al. ................... 528/392 |
| 5,109,047 | 4/1992 | Aaronson et al. ............. 524/357 |

FOREIGN PATENT DOCUMENTS

| | | |
|---|---|---|
| 0301664 | 2/1989 | European Pat. Off. |
| 384517 | 8/1990 | European Pat. Off. |
| 390237 | 10/1990 | European Pat. Off. |
| 390292 | 10/1990 | European Pat. Off. |
| 393790 | 10/1990 | European Pat. Off. |

OTHER PUBLICATIONS

Z. Jiang, et al., "Synthetic and Mechanistic Aspects of Palladium (II) Catalyzed Alternating Copolymerization of Carbon Monoxide with δ-Olefins", Polymer Preprints, vol. 33, No. 1, 1233-1234 (1992).

Primary Examiner—John Kight, III
Assistant Examiner—Shelley A. Dodson
Attorney, Agent, or Firm—Richard P. Fennelly; Louis A. Morris

[57] ABSTRACT

A linear alternating copolymer of carbon monoxide and propylene, which is substantially free of ester and ether linkages, is formed by the catalyzed reaction of carbon monoxide and propylene in a ketone solvent medium (e.g., acetone). Acid end groups can be introduced if a mixture of water and ketone is used.

4 Claims, No Drawings

COPOLYMER OF CARBON MONOXIDE AND PROPYLENE AND PROCESS FOR ITS FORMATION

This is a continuation of application Ser. No. 08/096,576 filed Jul. 23, 1993, now abandoned, which is a continuation of U.S. Ser. No. 07/911,822, filed Jul. 10, 1992, now abandoned, which was a division of U.S. Ser. No. 07/595,069, filed Oct. 10, 1990, also now abandoned.

BACKGROUND OF THE INVENTION

In recent years a rather large number of patents have issued describing polyketone compositions and how they might be synthesized. These are polymers of carbon monoxide and at least one olefin. Representative examples include copolymers of carbon monoxide and ethylene, and terpolymers of carbon monoxide, ethylene, and another olefin, such as propylene (e.g., see U.S. Pat. No. 4,880,903).

U.S. Pat. No. 3,694,412 to K. Nozaki, in Example VI, refers to preparation of an interpolymer of carbon monoxide and propylene using acetonitrile as a solvent. It is well known that such polymers were random polymers of those monomeric constituents having no substantial utility.

U.S. Pat. No. 4,824,934, in Example 15, shows the synthesis of a carbon monoxide/propylene copolymer using a methanol solvent medium. As illustrated by Comparative Example 2, below, such a polymeric composition contains both ether and ester linkages which have the disadvantage of enhancing decomposition and decreasing stability during processing.

The generalized structures for the known carbon monoxide/ethylene and carbon monoxide/ethylene/propylene polyketone materials of the prior art, which generally have been made in methanol solvent, are as follows:

CO/Ethylene
(Known)

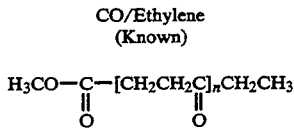

In the above formula, n will generally range from about 170 to about 17,000.

CO/Ethylene/Propylene
(Known)

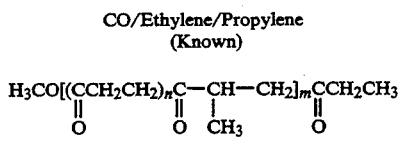

In the above formula, m and n will be selected so that the total molecular weight will be from about 10,000 to about 300,000 with the content of moiety —C(O)CH(CH$_3$)CH$_2$— being from about 0% to about 12%.

SUMMARY OF THE INVENTION

It has now been found possible to synthesize a linear alternating copolymer of carbon monoxide and propylene which is substantially free of ether and ester linkages. Such a result is achieved by conducting the polymerization in a ketone solvent using otherwise conventional polymerization techniques known to be useful in the synthesis of polyketone materials. It has also been found possible to modify the structure of the foregoing copolymers by conducting the polymerization in the presence of a mixture of water and ketone solvent to introduce acid end groups into the polymer.

DETAILED DESCRIPTION OF THE INVENTION

The general synthesis procedure, with the exception of the type of solvent and the particular monomers (carbon monoxide and propylene) to use, is well known to persons familiar with the synthesis of linear alternating polymers of carbon monoxide and ethylene, for example. One technique useful is to utilize a catalyst composition based on a palladium compound, an acid with a pK$_a$ of less than 6, and a bidentate compound of arsenic, antimony, phosphorus, or nitrogen as mentioned in European Pat. Publ. No. 301,664 which illustrates the synthesis of carbon monoxide/ethylene copolymers exclusively in a solvent system where only a part of the alcoholic solvent has been replaced with a ketone solvent to increase the molecular weight and bulk density of the resulting polymers.

It has now been surprisingly found that the use of an essentially ketonic solvent medium allows for the synthesis of novel carbon monoxide/propylene copolymers which are substantially free of either the ester or ether moieties which result if the synthesis of such a copolymer is attempted in an alcoholic solvent such as methanol. Examples of suitable ketone solvents to use herein include the C$_1$-C$_4$ ketones such as acetone, diethyl ketone, ethyl propyl ketone, dipropyl ketone, and methyl isobutyl ketone. Acetone is preferred.

The generalized structure for the novel carbon monoxide-propylene copolymer of this invention when the reaction is conducted in an essentially ketonic solvent is as follows:

CO/Propylene
(Novel)

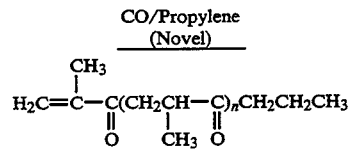

The repeat unit, n, can be from about 10 to about 300.

If the reaction, to the contrary, is conducted in alcohol solvent (e.g., methanol), the following mixture of ester and ether-terminated structures are produced (with R being derived from the alcohol, e.g., methyl in the case of methanol and n is the same as mentioned for the carbon monoxide/propylene material earlier described.

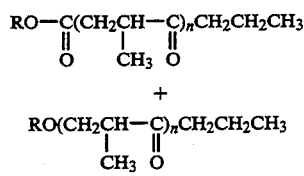

It has also been found possible to introduce acid end groups into the polymers by conducting the polymerization in the presence of a mixture of ketone and water.

Conducting the reaction in water and ketone yields a product mixture where each of the above two structures shown for the use of an alcohol solvent have the C(O)OR and OR groups replaced with C(O)OH and OH. The copolymer that results can be crosslinked to other polymers through the acid groups thus formed.

The present invention is further illustrated by the Examples which follow.

EXAMPLE 1

This process is a modification of the process shown in European Patent Publication No. 301,664.

The catalyst used in this Example was prepared by placing 0.22 gm of palladium acetate, 0.43 gm of para-toluenesulfonic acid, and 0.44 gm of 1,3-bis(diphenylphosphino)propane in a flask equipped with a stir bar. To this was added 20 ml of dry acetone and 14 ml of dry acetonitrile. The mixture was then stirred for ten minutes at room temperature followed by warming to 50° C. for five minutes. This resulted in a clear yellow solution which was cooled to 30° C. followed by removal of the solvent under vacuum. The product was a yellow solid.

An autoclave was charged with 1 liter of dry acetone at room temperature. The catalyst prepared above was then dissolved in 20 ml of dry acetone and added to the autoclave. The solution was degassed by pressurizing with 4 bar nitrogen followed by release of the pressure, repeating this ten times. The reactor was then charged with 500 ml of liquid propylene. The solution was then warmed to 70° C. and then pressurized to 85 bar with carbon monoxide. The solution was stirred for seventeen hours during which time the pressure dropped to 65 bar. The solvent was removed under vacuum. The product was an oil which flowed easily at room temperature. In the $^{13}C$ NMR spectrum there were no peaks at $\delta176$, $\delta174$, $\delta173$, $\delta73$, or $\delta56$ which indicated the absence of ester or ether functionalities. This is in contrast to Comparative Example 2, below.

COMPARATIVE EXAMPLE 2

This Example was an essential duplication of the work described in Example 15 of U.S. Pat. No. 4,824,934. It was done at ten times the scale of that Example.

Copper para-tosylate (0.5 gm) was placed in a flask. Into a separate flask was placed 0.22 gm of palladium acetate and 0.46 gm of bis(diphenylphosphido)propane. The foregoing compounds were then dissolved in 500 ml of methanol and were rapidly placed in an autoclave. The solution was degassed as described in Example 1. To the degassed solution was added 300 ml of propylene. The reactor was then pressurized to 50 bar with carbon monoxide and the temperature was raised to 85° C. The mixture was stirred for four and one-half hours and then it was cooled to room temperature and the pressure was released. The solvent was removed under vacuum. The product was a non-viscous oil with inorganic solids suspended in After filtration through silica gel it was a yellow oil. The presence of ester and ether functionalities was indicated in the $^{13}C$ NMR spectrum by peaks at $\delta176$, $\delta174$, $\delta173$, $\delta73$, or $\delta56$.

EXAMPLE 3

The catalyst was prepared in the same fashion as in Example 1 above. The autoclave was charged in the same fashion as in Example 1 above. The only differences were that the initial pressure was 80 bar, the final pressure was 68 bar, and the temperature was 45° C. The solvent was removed under vacuum to leave 154 gm of product. This product was an oil which could be made to flow only upon heating.

EXAMPLE 4

The catalyst was prepared in the same fashion as in Example 1 above. The autoclave was charged in the same fashion as in Example 1 above. The only differences were that the initial pressure was 57 bar, the final pressure was 46 bar, and the temperature was 30° C. The solvent was removed under vacuum to leave 144 gm of product. The product was a tacky solid.

EXAMPLE 5

The catalyst was prepared in the same fashion as in Example 1 above. The autoclave was charged in the same fashion as in Example 1 above. The only differences were that the initial pressure was 65 bar, the final pressure was 8 bar, the time was 118 hours, and the temperature was 30° C. The solvent was removed under vacuum to leave 290 gm of product. The product was a solid elastomer having good mechanical strength. It has a Tg of 15° C. This compound forms a miscible blend with polyvinyl chloride.

EXAMPLES 6-7

A palladium catalyst was prepared by dissolving 1.2 mmol of palladium acetate, 2.6 mmol of p-toluenesulfonic acid and 1.3 mmol of 1,3-bis(diphenylphosphino)propane in 60 ml of 1:1 (v/v) acetone/acetonitrile. Upon dissolution, the solvent was removed under vacuum. The resultant residue was redissolved in one liter of deoxygenated acetone, and 25 ml of deoxygenated water was added to the catalyst solution. The catalyst solution was then charged to a 4 liter autoclave. Propylene (241 gm) was charged to the autoclave, and carbon monoxide was then charged to the autoclave until a pressure of 68 bar was attained. The contents of the autoclave were then heated to 65° C. After 64 hours, the contents of the autoclave were cooled to room temperature, and the pressure was released. The orange-colored solution was removed from the autoclave, the solution was dried over anhydrous $MgSO_4$, and the mixture was filtered. The filtrate was then reduced to a viscous oil under dynamic vacuum at about 40° C. Upon cooling to room temperature, a solid resin was formed. The yield of polymer was 127 gm which corresponded to an activity of 1000 gm polymer/gm palladium.

The acidity of the polymer was confirmed by titrating acetone solutions of the polymer with a standardized aqueous NaOH solution. The results of the titration study are contained in the following Table:

| Example | Weight of Polymer | Volume of 1.0 N NaOH |
| --- | --- | --- |
| 6 | 0.50 gm | 0.17 ml |
| 7 | 0.48 gm | 0.14 ml |

The foregoing Examples are presented to illustrate certain aspects of the present invention and should not, for that reason, be construed in a limiting sense. The scope of protection sought is set forth in the claims which follow.

We claim:

1. A linear alternating copolymer of carbon monoxide and propylene which is substantially free of ester and ether linkages and which consists essentially of the formula

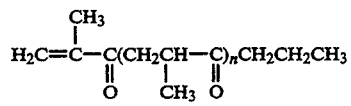

where n ranges from about 10 to about 300.

2. A process for the formation of the copolymer of claim 1 which comprises polmerizing carbon monoxide and propylene with a catalyst composition based on a palladium compound, an acid with a pK of less than 6, and a bidentate compound of arsenic, antimony, phosphorus, or nitrogen in an essentially ketone solvent medium.

3. A process as claimed in claim 2 wherein the ketone is a $C_1$–$C_4$ ketone.

4. A process as claimed in claim 2 wherein the ketone is acetone.

* * * * *